(12) United States Patent
Itoh (10) Patent No.: US 11,512,792 B2
(45) Date of Patent: Nov. 29, 2022

(54) ELECTROMAGNETIC VALVE

(71) Applicant: CKD CORPORATION, Komaki (JP)

(72) Inventor: Shinji Itoh, Komaki (JP)

(73) Assignee: CKD CORPORATION, Komaki (JP)

( * ) Notice: Subject to any disclaimer, the term of this patent is extended or adjusted under 35 U.S.C. 154(b) by 586 days.

(21) Appl. No.: 16/555,793

(22) Filed: Aug. 29, 2019

(65) Prior Publication Data

US 2020/0072377 A1 Mar. 5, 2020

(30) Foreign Application Priority Data

Sep. 3, 2018 (JP) .............................. JP2018-164339

(51) Int. Cl.
*F16K 31/06* (2006.01)
*H01F 7/08* (2006.01)
*H01F 7/06* (2006.01)

(52) U.S. Cl.
CPC ......... *F16K 31/0679* (2013.01); *H01F 7/081* (2013.01); *F16K 31/0651* (2013.01); *F16K 31/0655* (2013.01); *H01F 7/06* (2013.01)

(58) Field of Classification Search
CPC .. F16K 11/07; F16K 31/0613; F16K 31/0627; F16K 31/034; F16K 31/0675; F16K 31/0679; H01F 7/06; H01F 7/081; H01F 7/1638; H01F 2007/083; H01F 2007/086
See application file for complete search history.

(56) References Cited

U.S. PATENT DOCUMENTS 5,703,559 A 12/1997 Emmerich et al.
6,373,361 B1 * 4/2002 Umemoto ............... H01F 7/081
335/220
6,496,092 B1 12/2002 Schnatterer
7,178,704 B2 * 2/2007 Saidman ............... B05C 5/0225
251/129.09
2011/0001073 A1 1/2011 Ogawa

FOREIGN PATENT DOCUMENTS

| JP | 2002-317838 A | 10/2002 |
|---|---|---|
| JP | 2002-541402 A | 12/2002 |
| JP | 2010-101349 A | 5/2010 |
| JP | 5502240 B2 | 2/2015 |

OTHER PUBLICATIONS

Office Action for JP Patent Application No. 2018-164339 dated Jan. 5, 2021, including English machine translation (6 pages).
German Office Action dated Jul. 11, 2022 for German patent application DE 10 2019 123 166.3 with English Translation.

* cited by examiner

*Primary Examiner* — Matthew W Jellett
(74) *Attorney, Agent, or Firm* — J. Miguel Hernandez; James R. Gourley; Carstens, Allen & Gourley, LLP (57) ABSTRACT

An electromagnetic valve has a solenoid, which includes a coil, a plunger, a fixed core, and a plunger spring. The fixed core is E-shaped and has a base, a first outer leg, a second outer leg, and a central leg. The first outer leg, the second outer leg, and the central leg extend from the base. The first outer leg has a first outer attraction surface configured to attract the plunger. The second outer leg has a second outer attraction surface configured to attract the plunger. The central leg has a central attraction surface configured to attract the plunger. The central attraction surface is larger in area than each of the first and second outer attraction surfaces.

5 Claims, 8 Drawing Sheets

ELECTROMAGNETIC VALVE

BACKGROUND

1. Field

The present disclosure relates to an electromagnetic valve including a solenoid having a plunger, which is moved by magnetic excitation of a coil.

2. Description of Related Art

The solenoid of an electromagnetic valve includes a coil, a plunger moved by magnetic excitation of the coil, a fixed core having an attraction surface for attracting the plunger, and a plunger spring, which urges the plunger away from the attraction surface of the fixed core. For example, Japanese Patent No. 5502240 discloses an electromagnetic valve having a U-shaped fixed core. The fixed core includes a base section and first and second leg sections extending parallel to each other from the base section. The distal end of the first leg section, which is opposite to the base section, includes an attraction surface for attracting the plunger. The distal end of the second leg section, which is opposite to the base section, includes an attraction surface for attracting the plunger. A coil is wound around each of the first and second leg sections. When an electrical current is passed through the coils, a magnetic flux is generated through the fixed core and the plunger. Accordingly, the plunger moves toward the attraction surfaces of the first and second leg sections against the urging force of the plunger spring.

When the fixed core is magnetically saturated, the saturation weakens the attraction force generated between the attraction surface of the first leg section and the plunger and between the attraction surface of the second leg section and the plunger. This may cause the plunger to tilt relative to the fixed core. Tilting of the plunger relative to the fixed core causes the distance between the attraction surface of the first leg section and the plunger to differ from the distance between the attraction surface of the second leg section and the plunger. This creates a difference between the attraction force generated between the attraction surface of the first leg section and the plunger and the attraction force generated between the attraction surface of the second leg section and the plunger. This difference may cause the plunger to further tilt relative to the fixed core.

SUMMARY

It is an objective of the present disclosure to provide an electromagnetic valve that limits magnetic saturation of the fixed core and tilting of the plunger relative to the fixed core.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electromagnetic valve including a solenoid is provided. The solenoid includes a coil, a plunger configured to be moved by magnetic excitation of the coil, a fixed core configured to attract the plunger, and a plunger spring configured to urge the plunger in a direction away from the fixed core. The fixed core is E-shaped and includes a base, a first outer leg and a second outer leg extending parallel to each other from the base, and a central leg extending from the base and located between the first and second outer legs. The first outer leg has a distal end, which is opposite to the base and includes a first outer attraction surface configured to attract the plunger. The second outer leg has a distal end, which is opposite to the base and includes a second outer attraction surface configured to attract the plunger. The central leg has a distal end, which is opposite to the base and includes a central attraction surface configured to attract the plunger. The central attraction surface is larger in area than each of the first and second outer attraction surfaces.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Referring to FIGS. 1 to 6, an electromagnetic valve according to a first embodiment is now described.

Figure 1:
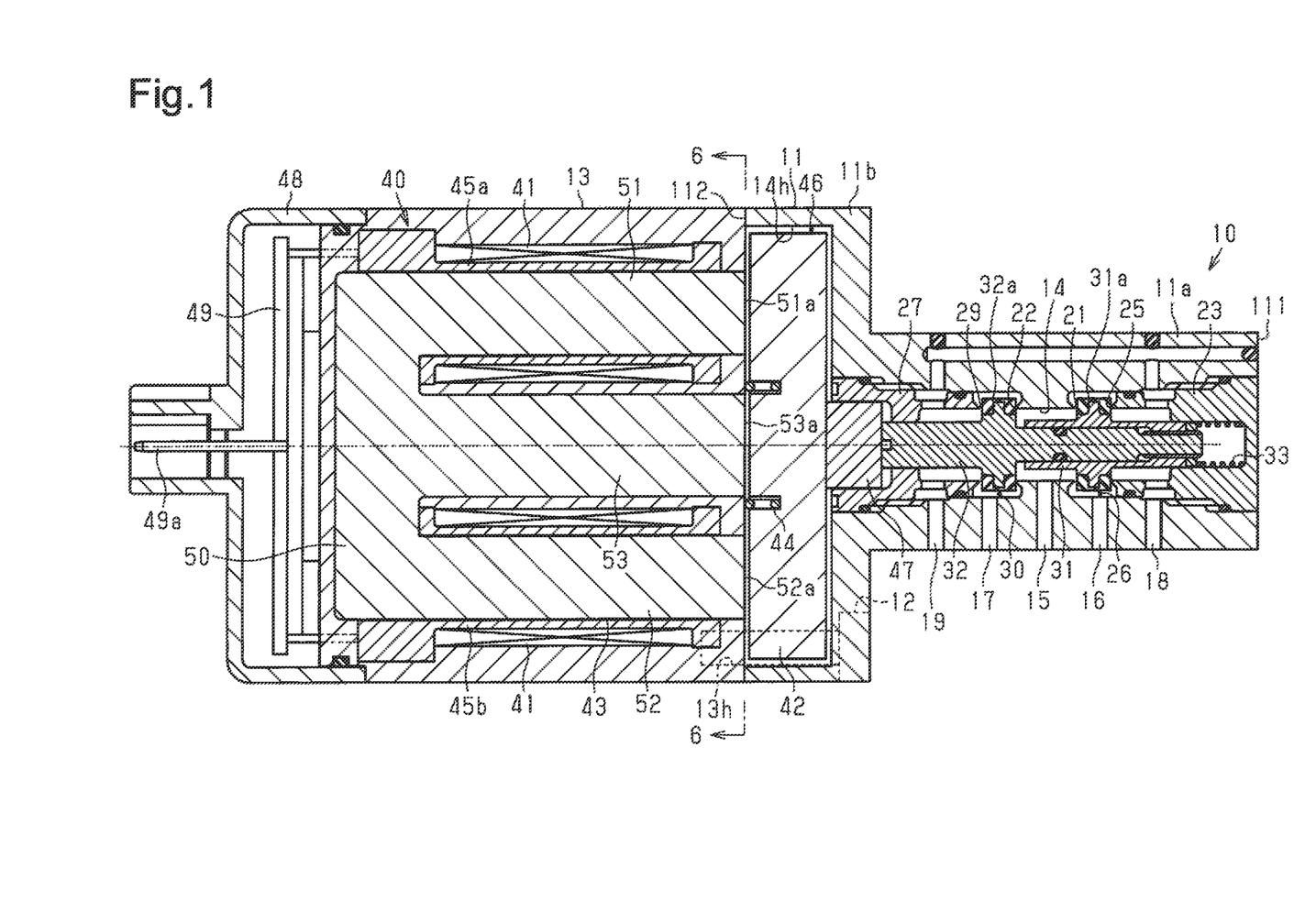
FIG. 1 is a cross-sectional view of an electromagnetic valve according to a first embodiment.

As shown in FIG. 1, an electromagnetic valve 10 includes a body 11 having a rectangular cross-section and a housing 13 having the shape of a rectangular block. The housing 13 is coupled to the body 11 by bolts 12. The body 11 and the housing 13 are made of a nonmagnetic material, such as plastic.

The body 11 has a main body section 11a, which is a peripheral wall having a rectangular cross-section, and a flange 11b, which projects from the main body section 11a. The long dashed short dashed lines in FIGS. 1 to 3 indicate the axis of the body 11. The flange 11b extends in a direction perpendicular to the axis from the end of the main body section 11a that is closer to the housing 13. The flange 11b has a rectangular outer edge. The housing 13 is coupled to the flange 11b by the bolts 12.

The body 11 has a first end face 111, which is a first end in the axial direction, and a second end face 112, which is a second end in the axial direction. The first end face 111 is the end face of the main body section 11a opposite to the housing 13. The second end face 112 is the end face of the flange 11b closer to the housing 13.

Figure 2:
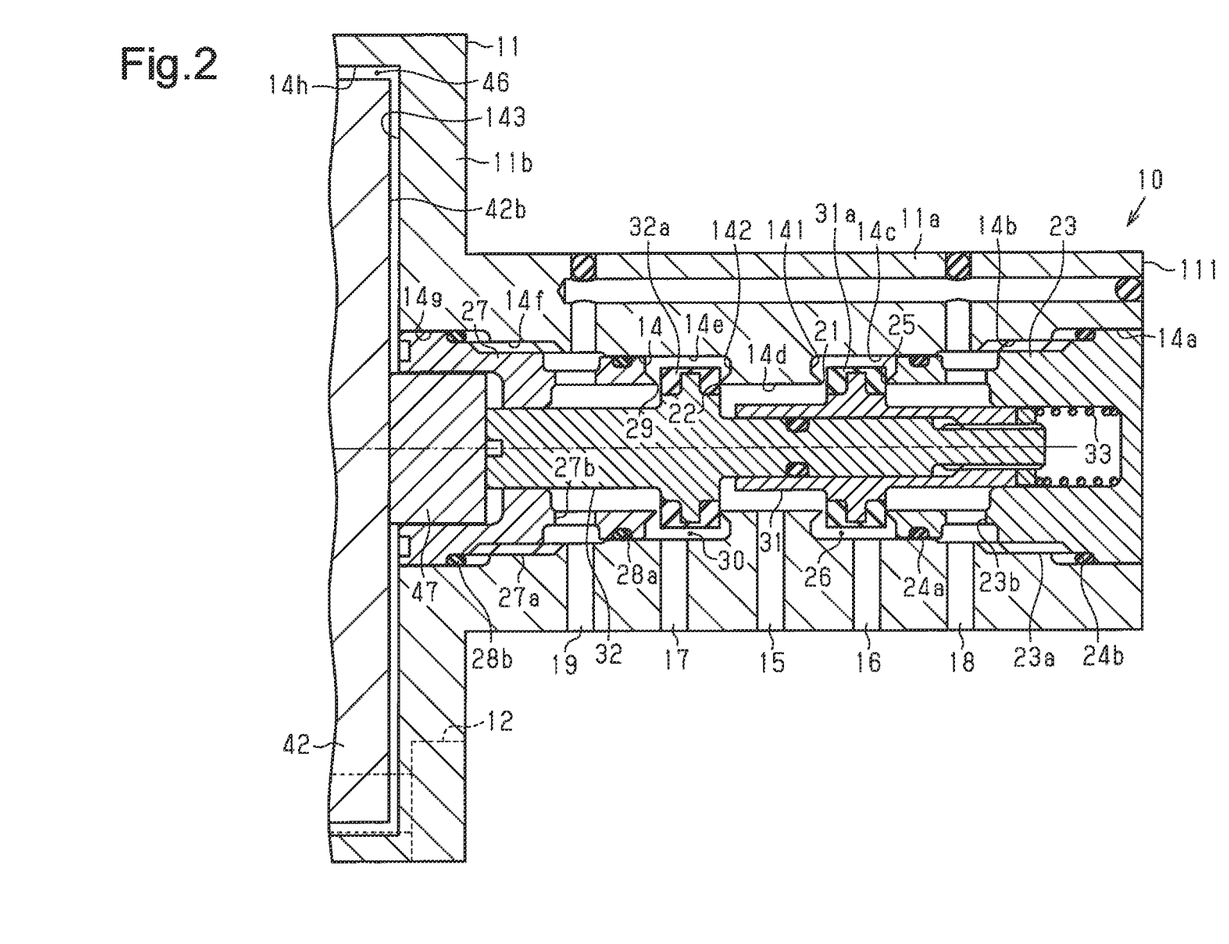
FIG. 2 is an enlarged cross-sectional view showing a part of the electromagnetic valve of FIG. 1.

As shown in FIG. 2, the body 11 has a circular through-hole 14 extending through the body 11 in the axial direction. The body 11 has a supply port 15, a first output port 16, a second output port 17, a first discharge port 18, and a second discharge port 19, which communicate with the through-hole 14 at their inner ends. The first discharge port 18, the first output port 16, the supply port 15, the second output port 17, and the second discharge port 19 are arranged in this order along the axis. The ends (outer ends) of the supply port 15, the first output port 16, the second output port 17, the first discharge port 18, and the second discharge port 19 opposite to the through-hole 14 open to the outer surface of the body 11. The electromagnetic valve 10 of the present embodiment is a five-port switching valve.

The through-hole 14 includes a first large diameter hole 14a, a first threaded hole 14b, a first middle diameter hole 14c, a small diameter hole 14d, a second middle diameter hole 14e, a second threaded hole 14f, a second large diameter hole 14g, and an accommodation hole 14h, which are arranged along the axis. The first large diameter hole 14a, the first threaded hole 14b, the first middle diameter hole 14c, the small diameter hole 14d, the second middle diameter hole 14e, the second threaded hole 14f, the second large diameter hole 14g, and the accommodation hole 14h are arranged in this order from the first end face 111 toward the second end face 112. The first large diameter hole 14a opens to the first end face 111. The accommodation hole 14h opens to the second end face 112. The first large diameter hole 14a, the first threaded hole 14b, the first middle diameter hole 14c, the small diameter hole 14d, the second middle diameter hole 14e, the second threaded hole 14f, the second large diameter hole 14g, and the accommodation hole 14h are coaxial.

The first and second large diameter holes 14a and 14g have the same diameter. The first and second middle diameter holes 14c and 14e have the same diameter. The diameter of the first and second middle diameter holes 14c and 14e is smaller than the diameter of the first and second large diameter holes 14a and 14g. The diameter of the small diameter hole 14d is smaller than the diameter of the first and second middle diameter holes 14c and 14e. The body 11 has an annular first step surface 141 connecting the surface defining the small diameter hole 14d to the surface defining the first middle diameter hole 14c. The first step surface 141 extends in a direction perpendicular to the axis. The body 11 also has an annular second step surface 142 connecting the surface defining the small diameter hole 14d to the surface defining the second middle diameter hole 14e. The second step surface 142 extends in a direction perpendicular to the axis.

The accommodation hole 14h has a larger diameter than the second large diameter hole 14g. The body 11 has an annular third step surface 143 connecting the surface defining the accommodation hole 14h to the surface defining the second large diameter hole 14g. The third step surface 143 extends in a direction perpendicular to the axis.

The body 11 has an annular first supply valve seat 21 and an annular second supply valve seat 22. The first supply valve seat 21 protrudes in the axial direction from the first step surface 141 into the first middle diameter hole 14c. The second supply valve seat 22 protrudes in the axial direction from the second step surface 142 into the second middle diameter hole 14e. The first supply valve seat 21 and the second supply valve seat 22 protrude away from each other from the first step surface 141 and the second step surface 142, respectively. That is, the first supply valve seat 21 and the second supply valve seat 22 face in opposite axial directions. The first and second supply valve seats 21 and 22 have the same inner diameter. The inner diameter of the first and second supply valve seats 21 and 22 is equal to the diameter of the small diameter hole 14d, and the inner circumference surfaces of the first and second supply valve seats 21 and 22 are flush with the inner circumference surface defining the small diameter hole 14d.

A first plug 23 is attached to the first end of the body 11. The first plug 23 includes an end wall, which is flush with the first end face 111, and a circumferential wall extending from the end wall along the axis. The outer circumferential surface of the first plug 23 has a first screw section 23a, which engages with the first threaded hole 14b. The engagement between the first screw section 23a and the first threaded hole 14b fixes the first plug 23 in the through-hole 14 of the body 11. The circumferential wall of the first plug 23 extends from the end wall beyond the inner end of the first discharge port 18, and the distal end of the circumferential wall is located near the inner end of the first output port 16. The cavity inside the first plug 23 communicates with the through-hole 14. The first plug 23 has a communication hole 23b at a position corresponding to the inner end of the first discharge port 18.

Annular first and second sealing members 24a and 24b are attached to the outer circumferential surface of the first plug 23. The first sealing member 24a is located between the first output port 16 and the first discharge port 18 in the axial direction. The first sealing member 24a limits leakage of fluid between the first output port 16 and the first discharge port 18 along the outer circumferential surface of the first plug 23 in the through-hole 14.

The second sealing member 24b is located between the first discharge port 18 and the first end face 111 in the axial direction. The second sealing member 24b helps to prevent the fluid leaking from the first discharge port 18 along the outer circumferential surface of the first plug 23 from flowing toward the first end face 111 in the through-hole 14.

The circumferential wall of the first plug 23 has a distal end face, which faces toward the first step surface 141, and an annular first discharge valve seat 25, which protrudes from the distal end face in the axial direction. The first discharge valve seat 25 faces toward the first supply valve seat 21 in the axial direction in the through-hole 14. The first discharge valve seat 25 and the first supply valve seat 21 have the same inner diameter. The first middle diameter hole 14c, the first step surface 141, the distal end face of the first plug 23, the first supply valve seat 21, and the first discharge valve seat 25 define a first valve chamber 26.

A tubular second plug 27 is attached to the body 11. The outer circumferential surface of the second plug 27 has a second screw section 27a, which engages with the second threaded hole 14f. The engagement between the second screw section 27a and the second threaded hole 14f fixes the second plug 27 in the through-hole 14 of the body 11. The second plug 27 includes a proximal end face, which is flush with the third step surface 143. The second plug 27 extends from the proximal end face beyond the inner end of the second discharge port 19. The distal end of the second plug 27 is located near the inner end of the second output port 17. The cavity inside the second plug 27 communicates with the through-hole 14. The second plug 27 has a communication hole 27b at a position corresponding to the inner end of the second discharge port 19.

Annular first and second sealing members 28a and 28b are attached to the outer circumferential surface of the second plug 27. The first sealing member 28a is located between the second output port 17 and the second discharge port 19 in the axial direction. The first sealing member 28a limits leakage of fluid between the second output port 17 and the second discharge port 19 along the outer circumferential surface of the second plug 27 in the through-hole 14.

The second sealing member 28b is located between the third step surface 143 and the second discharge port 19 in the axial direction. The second sealing member 28b helps to prevent the fluid leaking from the second discharge port 19 along the outer circumferential surface of the second plug 27 from flowing toward the third step surface 143 in the through-hole 14.

The second plug 27 has a distal end face, which faces toward the second step surface 142, and an annular second discharge valve seat 29, which protrudes from the distal end face in the axial direction. The second discharge valve seat 29 faces toward the second supply valve seat 22 in the axial direction in the through-hole 14. The second discharge valve seat 29 and the second supply valve seat 22 have the same inner diameter. The second middle diameter hole 14e, the second step surface 142, the distal end face of the second plug 27, the second supply valve seat 22, and the second discharge valve seat 29 define a second valve chamber 30.

The supply port 15 communicates with the small diameter hole 14d, which is a section of the through-hole 14 located between the first and second supply valve seats 21 and 22 in the axial direction. The first output port 16 communicates with the first valve chamber 26. The second output port 17 communicates with the second valve chamber 30. The first discharge port 18 communicates with a section of the through-hole 14 located between the first valve chamber 26 and the first end face 111. The second discharge port 19 communicates with a section of the through-hole 14 located between the second valve chamber 30 and the third step surface 143.

The electromagnetic valve 10 has first and second valve shafts 31 and 32, which are made of metal. The first valve shaft 31 has a first valve member 31a, which is accommodated in the first valve chamber 26. The second valve shaft 32 has a second valve member 32a, which is accommodated in the second valve chamber 30. The first valve shaft 31 is coaxially coupled to the second valve shaft 32. The first and second valve shafts 31 and 32 can integrally reciprocate in the through-hole 14 along the axis.

The first valve member 31a is located between the first supply valve seat 21 and the first discharge valve seat 25 in the axial direction. The first valve member 31a can come into and out of contact with the first supply valve seat 21 and the first discharge valve seat 25. The second valve member 32a is located between the second supply valve seat 22 and the second discharge valve seat 29 in the axial direction. The second valve member 32a can come into and out of contact with the second supply valve seat 22 and the second discharge valve seat 29.

The first plug 23 accommodates a valve spring 33. The valve spring 33 urges the first valve shaft 31 in a direction that moves the first valve member 31a away from the first discharge valve seat 25. The valve spring 33 also urges the second valve shaft 32 in a direction that moves the second valve member 32a away from the second supply valve seat 22.

Figure 3:
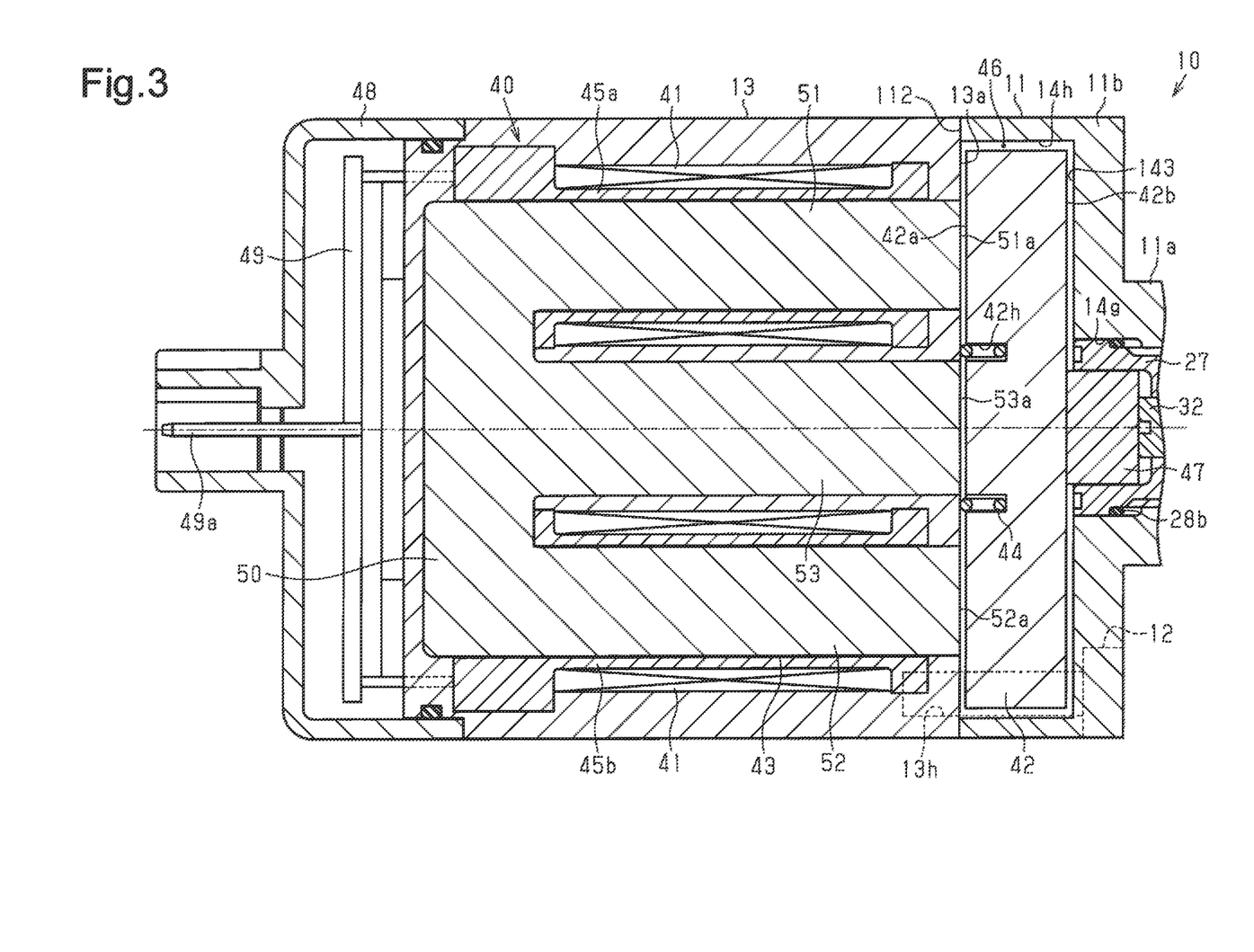
FIG. 3 is an enlarged cross-sectional view showing the section including the solenoid of the electromagnetic valve of FIG. 1.

As shown in FIG. 3, the electromagnetic valve 10 includes a solenoid 40. The solenoid 40 includes two coils 41, a plunger 42, which is a rectangular plate that is moved by magnetic excitation of the coils 41, a fixed core 43, which attracts the plunger 42, and a plunger spring 44, which urges the plunger 42 in a direction away from the fixed core 43.

The fixed core 43 is E-shaped and includes a base 50 and a first outer leg 51, a second outer leg 52, and a central leg 53, which extend from the base 50 in the same direction. The first outer leg 51 is parallel to the second outer leg 52. The central leg 53 is located between the first and second outer legs 51 and 52. The first outer leg 51 has a distal end, which is opposite to the base 50 and includes a first outer attraction surface 51a for attracting the plunger 42. The second outer leg 52 has a distal end, which is opposite to the base 50 and includes a second outer attraction surface 52a for attracting the plunger 42. The central leg 53 has a distal end, which is opposite to the base 50 and includes a central attraction surface 53a for attracting the plunger 42.

Figure 4:
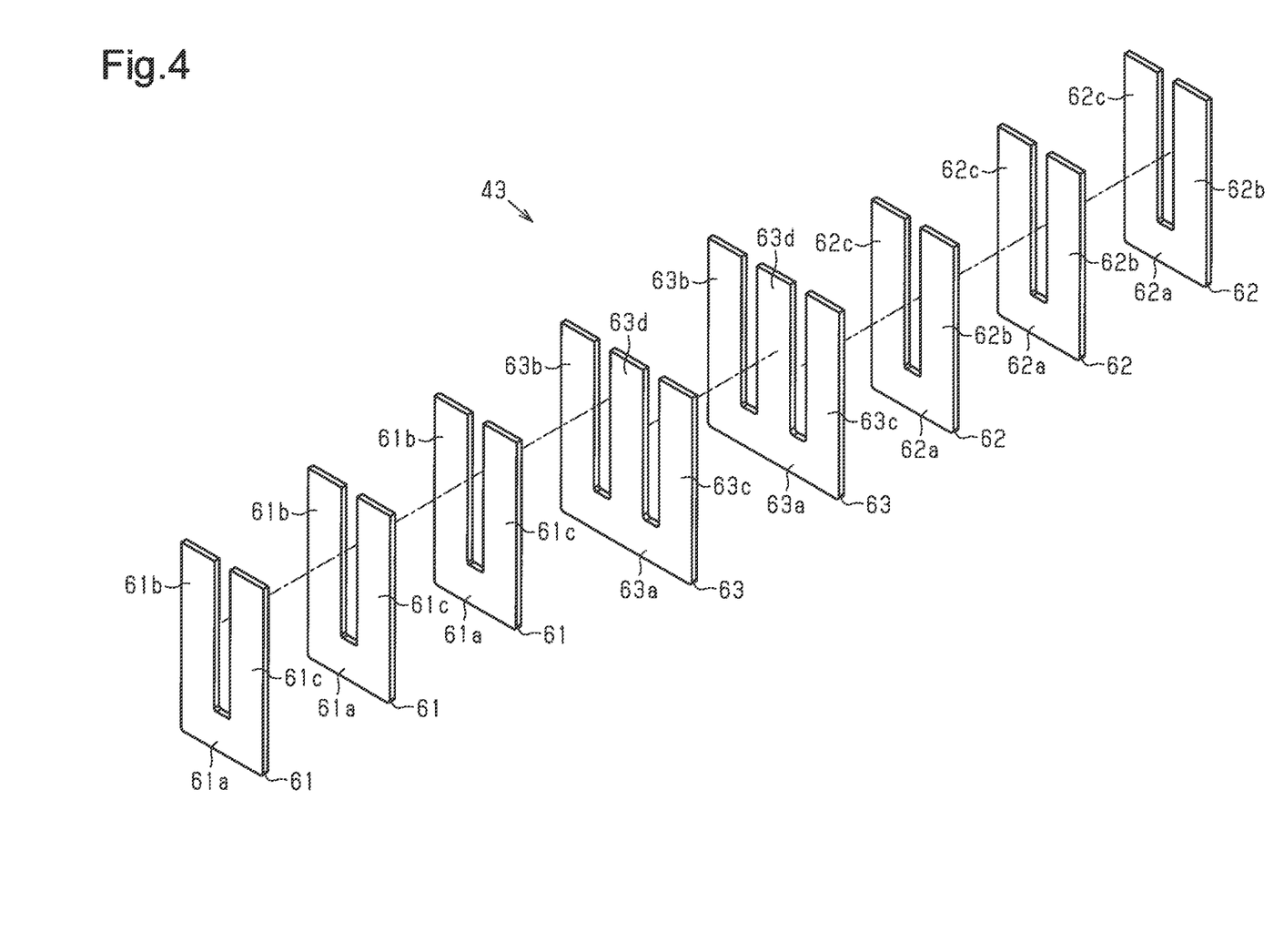
FIG. 4 is an exploded perspective view of the fixed core of the solenoid of FIG. 3.

As shown in FIG. 4, the fixed core 43 includes first U-shaped cores 61, second U-shaped cores 62, and E-shaped cores 63. The first U-shaped cores 61 are U-shaped thin electromagnetic steel plates. Each first U-shaped core 61 includes a base section 61a and first and second leg sections 61b and 61c extending from the base section 61a. The first and second leg sections 61b and 61c are parallel to each other.

The second U-shaped cores 62 are U-shaped thin electromagnetic steel plates. Each second U-shaped core 62 includes a base section 62a and first and second leg sections 62b and 62c extending from the base section 62a. The first and second leg sections 62b and 62c are parallel to each other.

The E-shaped cores 63 are E-shaped thin electromagnetic steel plates. Each E-shaped core 63 includes a base section 63a and first and second outer leg sections 63b and 63c extending from the base section 63a. Each E-shaped core 63 also includes a central leg section 63d extending from the base section 63a. The first and second outer leg sections 63b and 63c are parallel to each other. The central leg section 63d is located between the first and second outer leg sections 63b and 63c.

The first U-shaped cores 61, the second U-shaped cores 62, and the E-shaped cores 63 have the same thickness. The fixed core 43 is a laminate in which one or more first U-shaped cores 61, one or more E-shaped cores 63, and one or more second U-shaped cores 62 are stacked in this order. That is, the fixed core 43 is a laminate in which at least first and second U-shaped cores 61 and 62 are stacked. The first U-shaped cores 61, the E-shaped cores 63, and the second U-shaped cores 62 are stacked in a lamination direction. The fixed core 43 has a width direction, which is perpendicular to the lamination direction and to the direction in which the first outer leg 51, the second outer leg 52, and the central leg 53 extend from the base 50.

The first and second leg sections 61b and 61c of each first U-shaped core 61 have the same length extending from the base section 61a. The first and second leg sections 61b and 61c have the same width.

The first and second leg sections 62b and 62c of each second U-shaped core 62 have the same length extending from the base section 62a. The first and second leg sections 62b and 62c have the same width.

The first outer leg section 63b, the second outer leg section 63c, and the central leg section 63d of each E-shaped core 63 have the same length extending from the base section 63a. The first and second outer and central leg sections 63b, 63c and 63d have the same width.

The first and second leg sections 61b and 61c, the first and second leg sections 62b and 62c, the first and second outer leg sections 63b and 63c, and the central leg section 63d have the same length in the extension direction. The first and second leg sections 61b and 61c, the first and second leg sections 62b and 62c, the first and second outer leg sections 63b and 63c, and the central leg section 63d have the same width.

When one or more first U-shaped cores 61 are stacked with the one or more E-shaped cores 63, the first leg sections 61b are placed over the first outer leg sections 63b, and the second leg sections 61c are placed over the central leg sections 63d. Thus, the base sections 61a are placed over the parts of the base sections 63a that connect the first outer leg sections 63b and the central leg sections 63d.

When one or more second U-shaped cores 62 are stacked with the one or more E-shaped cores 63, the first leg sections 62b are placed over the second outer leg sections 63c, and the second leg sections 62c are placed over the central leg sections 63d. Thus, the base sections 62a are placed over the parts of the base sections 63a that connect the second outer leg sections 63c and the central leg sections 63d.

Figure 5:
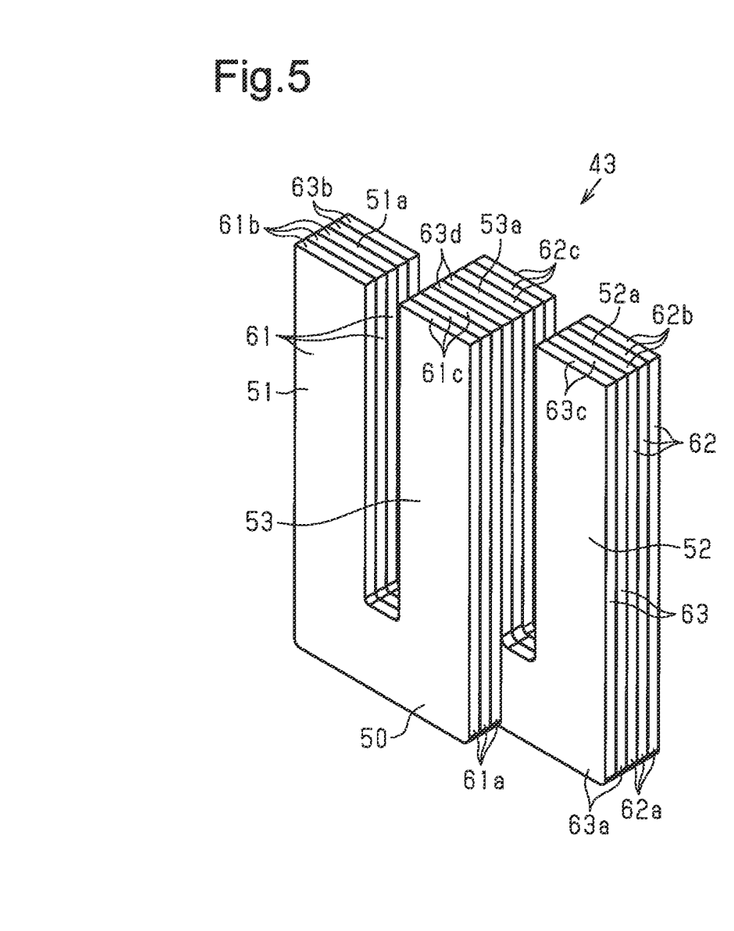
FIG. 5 is a perspective view of the fixed core of FIG. 4.

As shown in FIG. 5, the base 50 of the fixed core 43 includes the base sections 61a of the first U-shaped cores 61, the base sections 63a of the E-shaped cores 63, and the base sections 62a of the second U-shaped cores 62. The first outer leg 51 of the fixed core 43 includes the first leg sections 61b of the first U-shaped cores 61 and the first outer leg sections 63b of the E-shaped cores 63. The second outer leg 52 of the fixed core 43 includes the first leg sections 62b of the second U-shaped cores 62 and the second outer leg sections 63c of the E-shaped cores 63. The central leg 53 of the fixed core 43 includes the second leg sections 61c of the first U-shaped cores 61, the central leg sections 63d of the E-shaped cores 63, and the second leg sections 62c of the second U-shaped cores 62.

Each first U-shaped core 61 has a first section, which is at least a part of the first outer leg 51, a second section, which is a part of the base 50, and a third section, which is a part of the central leg 53. Each second U-shaped core 62 has a first section, which is at least a part of the second outer leg 52, a second section, which is a part of the base 50, and a third section, which is a part of the central leg 53. Further, each E-shaped core 63 is a part of each of the base 50, the first outer leg 51, the second outer leg 52, and the central leg 53.

The distal ends of the first leg sections 61b and the distal ends of the first outer leg sections 63b are located in the same plane. The distal ends of the first leg sections 61b and the distal ends of the first outer leg sections 63b form a first outer attraction surface 51a. The distal ends of the first leg sections 62b and the distal ends of the second outer leg sections 63c are located in the same plane. The distal ends of the first leg sections 62b and the distal ends of the second outer leg sections 63c of the E-shaped cores 63 form a second outer attraction surface 52a. The distal ends of the second leg sections 61c, the distal ends of the central leg sections 63d, and the distal ends of the second leg sections 62c are located in the same plane. The distal ends of the second leg sections 61c, the distal ends of the central leg sections 63d, and the distal ends of the second leg sections 62c form a central attraction surface 53a.

The first outer attraction surface 51a, the second outer attraction surface 52a, and the central attraction surface 53a have the same width. The first and second outer attraction surfaces 51a and 52a have the same dimension in the lamination direction. The central attraction surface 53a is longer than the first and second outer attraction surfaces 51a and 52a in the dimension in the lamination direction. Thus, the central attraction surface 53a has a larger area than each of the first and second outer attraction surfaces 51a and 52a.

As shown in FIG. 3, the electromagnetic valve 10 includes a tubular first bobbin 45a, which surrounds the periphery of the first outer leg 51, and a tubular second bobbin 45b, which surrounds the periphery of the second outer leg 52. A coil 41 is wound around each of the first and second bobbins 45a and 45b. As such, a coil 41 is wound around each of the periphery of the first outer leg 51 and the periphery of the second outer leg 52.

The fixed core 43 and the two coils 41 are accommodated in the housing 13 through plastic molding. The housing 13 has an end face 13a facing the body 11. The first outer attraction surface 51a, the second outer attraction surface 52a, and the central attraction surface 53a of the fixed core 43 are exposed on the end face 13a. The attraction surfaces 51a, 52a and 53a are located in the same plane as the end face 13a. The end face 13a, the first outer attraction surface 51a, the second outer attraction surface 52a, the central attraction surface 53a, the inner circumferential surface of the accommodation hole 14h, and the third step surface 143 define a plunger chamber 46 for accommodating the plunger 42. The body 11 thus defines the plunger chamber 46.

The plunger 42 has an end face 42a facing the housing 13. The end face 42a faces the first outer attraction surface 51a, the second outer attraction surface 52a, and the central attraction surface 53a of the fixed core 43. The end face 42a includes an annular accommodation groove 42h, which accommodates a plunger spring 44. The plunger spring 44 is a coil spring and has a first end, which is in contact with the bottom surface of the accommodation groove 42h, and a second end, which is in contact with the end face 13a of the housing 13. The plunger spring 44 is located between the plunger 42 and the end face 13a of the housing 13 in the plunger chamber 46.

The plunger 42 also has an end face 42b opposite to the housing 13. A contact member 47 is integrally attached to the end face 42b. The contact member 47 is received in the second plug 27 and in contact with the second valve shaft 32.

The housing 13 has an end opposite to the body 11, to which a cover 48 is attached. The cover 48 has a peripheral wall and an end wall closing one end of the peripheral wall. The cover 48 accommodates a control board 49, which is electrically connected to the two coils 41. The control board 49 is also connected to an external terminal 49a. The two coils 41 receive power from the external terminal 49a through the control board 49.

Figure 6:
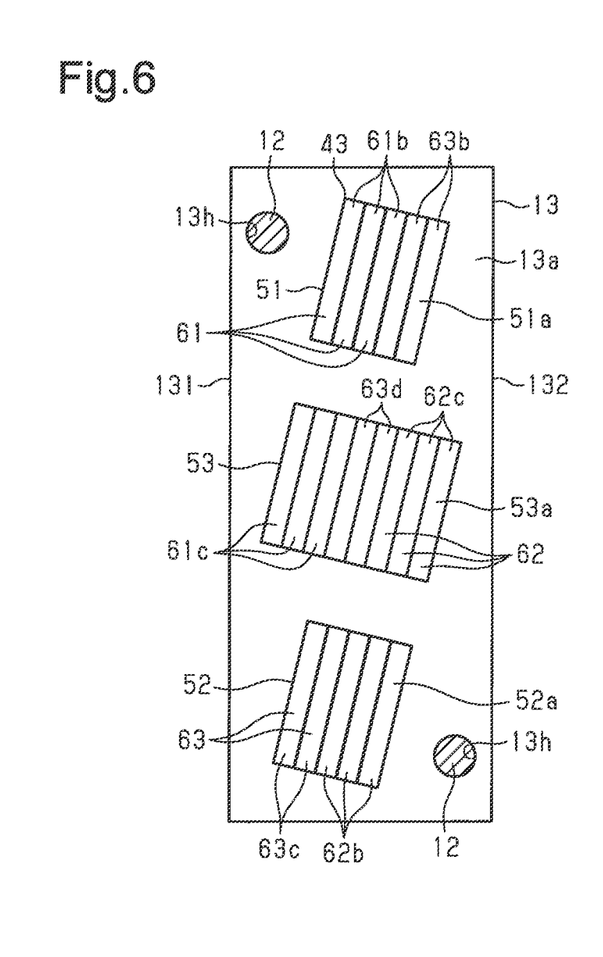
FIG. 6 is a cross-sectional view taken along line 6-6 in FIG. 1.

As shown in FIG. 6, the housing 13 has a first reference outer surface 131 and a second reference outer surface 132. The first reference outer surface 131 is closer to the first U-shaped cores 61 in the lamination direction of the first U-shaped cores 61, the E-shaped cores 63, and the second U-shaped cores 62. The second reference outer surface 132 is closer to the second U-shaped cores 62 in the lamination direction. The first and second reference outer surfaces 131 and 132 are parallel to each other. The fixed core 43 is placed in the housing 13 such that the fixed core 43 is inclined relative to the first and second reference outer surfaces 131 and 132.

The housing 13 has first and second threaded holes 13h each configured to receive a corresponding one of the two bolts 12. The first threaded hole 13h is located between the first reference outer surface 131 and the sections of the first U-shaped cores 61 that are at least a part of the first outer leg 51 (the first sections). The second threaded hole 13h is located between the second reference outer surface 132 and the sections of the second U-shaped cores 62 that are at least a part of the second outer leg 52 (the first sections). The two bolts 12 extend through the flange 11b of the body 11 into the first and second threaded holes 13h, fixing the housing 13 to the body 11.

The operation of the first embodiment is now described.

When an electrical current is passed through the two coils 41, a magnetic flux is produced through the fixed core 43 and the plunger 42. Accordingly, the plunger 42 moves toward the first outer attraction surface 51a, the second outer attraction surface 52a, and the central attraction surface 53a against the urging force of the plunger spring 44. This brings the end face 42a of the plunger 42 into contact with the attraction surfaces 51a, 52a and 53a.

At this time, the attraction force generated between the central attraction surface 53a and the end face 42a of the plunger 42 limits tilting of the plunger 42 relative to the fixed core 43. This reduces the possibility that the plunger 42 will tilt relative to the fixed core 43 causing the distance between the first outer attraction surface 51a and the end face 42a of the plunger 42 to differ from the distance between the second outer attraction surface 52a and the end face 42a of the plunger 42.

In addition, since the central attraction surface 53a is larger in area than each of the first and second outer attraction surfaces 51a and 52a, the magnetic flux is more likely to flow to the central attraction surface 53a as compared with a configuration in which the central attraction surface 53a is smaller in area than or equal to each of the first and second outer attraction surfaces 51a and 52a. The fixed core 43 is thus less likely to be magnetically saturated. This limits reduction in the attraction force generated between the first outer attraction surface 51a and the end face 42a of the plunger 42, between the second outer attraction surface 52a and the end face 42a of the plunger 42, and between the central attraction surface 53a and the end face 42a of the plunger 42. The plunger 42 is therefore unlikely to tilt relative to the fixed core 43.

When the plunger 42 moves, the urging force of the valve spring 33 moves the first and second valve shafts 31 and 32. This moves the first valve member 31a away from the first discharge valve seat 25 and moves the second valve member 32a away from the second supply valve seat 22. Then, the first valve member 31a is seated on the first supply valve seat 21, and the second valve member 32a is seated on the second discharge valve seat 29. As a result, the communication between the supply port 15 and the first output port 16 via the small diameter hole 14d and the first valve chamber 26 is blocked, and the first output port 16 communicates with the first discharge port 18 via the first valve chamber 26, the inner side of the first plug 23, and the communication hole 23b. In addition, the supply port 15 communicates with the second output port 17 via the small diameter hole 14d and the second valve chamber 30, and the communication between the second output port 17 and the second discharge port 19 via the second valve chamber 30, the inner side of the second plug 27, and the communication hole 27b is blocked.

When the two coils 41 are de-energized, the magnetic flux passing through the fixed core 43 and the plunger 42 ceases. Then, the urging force of the plunger spring 44 moves the plunger 42 in a direction away from the first outer attraction surface 51a, the second outer attraction surface 52a, and the central attraction surface 53a. The plunger 42 presses the first and second valve shafts 31 and 32 against the urging force of the valve spring 33. This moves the first and second valve shafts 31 and 32. Specifically, the first valve member 31a moves away from the first supply valve seat 21, and the second valve member 32a moves away from the second discharge valve seat 29. Then, the first valve member 31a is seated on the first discharge valve seat 25, and the second valve member 32a is seated on the second supply valve seat 22. As a result, the supply port 15 communicates with the first output port 16 via the small diameter hole 14d and the first valve chamber 26, and the communication between the first output port 16 and the first discharge port 18 via the first valve chamber 26, the inner side of the first plug 23, and the communication hole 23b is blocked. In addition, the communication between the supply port 15 and the second output port 17 via the small diameter hole 14d and the second valve chamber 30 is blocked, and the second output port 17 communicates with the second discharge port 19 via the second valve chamber 30, the inner side of the second plug 27, and the communication hole 27b.

The first valve member 31a and the second valve member 32a are brought into and out of contact with the first supply valve seat 21 and the second supply valve seat 22, respectively, thereby switching the flow paths of the electromagnetic valve 10.

The first embodiment has the following advantages.

(1-1) The fixed core 43 is E-shaped and includes the base 50 and the first outer leg 51, the second outer leg 52, and the central leg 53 extending from the base 50. The end face of the first outer leg 51 opposite to the base 50 is the first outer attraction surface 51a for attracting the plunger 42. The end face of the second outer leg 52 opposite to the base 50 is the second outer attraction surface 52a for attracting the plunger 42. The end face of the central leg 53 opposite to the base 50 is the central attraction surface 53a for attracting the plunger 42. In this configuration, the attraction force generated between the central attraction surface 53a and the plunger 42 limits tilting of the plunger 42 relative to the fixed core 43. This reduces the possibility that the plunger 42 will tilt relative to the fixed core 43 causing the distance between the first outer attraction surface 51a and the plunger 42 to differ from the distance between the second outer attraction surface 52a and the plunger 42. In addition, since the central attraction surface 53a is larger in area than each of the first and second outer attraction surfaces 51a and 52a, the magnetic flux is more likely to flow to the central attraction surface 53a as compared with a configuration in which the central attraction surface 53a is smaller in area than or equal to each of the first and second outer attraction surfaces 51a and 52a. The fixed core 43 is thus less likely to be magnetically saturated. This limits reduction in the attraction force generated between the first outer attraction surface 51a and the plunger 42, between the second outer attraction surface 52a and the plunger 42, and between the central attraction surface 53a and the plunger 42. The plunger 42 is therefore unlikely to tilt relative to the fixed core 43. Accordingly, the configuration described above limits magnetic saturation of the fixed core 43 and tilting of the plunger 42 relative to the fixed core 43.

(1-2) The fixed core 43 is a laminate in which at least first and second U-shaped cores 61 and 62 are stacked. As such, the fixed core 43, in which the central attraction surface 53a is larger in area than each of the first and second outer attraction surfaces 51a and 52a, can be formed simply by layering at least first and second U-shaped cores 61 and 62.

(1-3) The fixed core 43 is a laminate in which one or more first U-shaped cores 61, one or more E-shaped cores 63, and one or more second U-shaped cores 62 are stacked in this order. The fixed core 43 is formed by placing the first U-shaped cores 61 on one side of the E-shaped cores 63 and placing the second U-shaped cores 62 on the other side of the E-shaped cores 63 in the lamination direction. This allows the first and second U-shaped cores 61 and 62 and the E-shaped cores 63 to be stacked in a stable manner.

(1-4) The fixed core 43 is placed in the housing 13 such that the fixed core 43 is inclined relative to the first and second reference outer surfaces 131 and 132. The housing 13 includes the first and second threaded holes 13h each receiving a corresponding one of the two bolts 12. The first threaded hole 13h is located between the first reference outer surface 131 and the sections of the first U-shaped cores 61 that are at least a part of the first outer leg 51 (the first sections). The second threaded hole 13h is located between the second reference outer surface 132 and the sections of the second U-shaped cores 62 that are at least a part of the second outer leg 52 (the first sections). The fixed core 43 inclined relative to the first and second reference outer surfaces 131 and 132 leaves spaces in the housing 13 for placing the two threaded holes 13h. This allows the housing 13 to have a smaller size, enabling the overall size of the electromagnetic valve 10 to be smaller.

(1-5) A coil 41 is wound around each of the periphery of the first outer leg 51 and the periphery of the second outer leg 52. This allows each coil 41 to be smaller in size than that in a configuration in which a coil 41 is wound only around the periphery of the central leg 53 in order to generate attraction force between the first outer attraction surface 51a and the plunger 42, between the second outer attraction surface 52a and the plunger 42, and between the central attraction surface 53a and the plunger 42. It is thus possible to reduce the overall size of the electromagnetic valve 10.

(1-6) In order to form a fixed core 43 in which the central attraction surface 53a is larger in area than each of the first and second outer attraction surfaces 51a and 52a, two U-shaped cores can be arranged side by side in the width direction so that their adjacent leg sections form the central leg, for example. However, these two U-shaped cores arranged in the width direction increase the size of the fixed core 43 in the width direction. In contrast, the present embodiment simply layers the first U-shaped cores 61, the E-shaped cores 63, and the second U-shaped cores 62 to form the fixed core 43 in which the central attraction surface 53a is larger in area than each of the first and second outer attraction surfaces 51a and 52a, allowing the fixed core 43 to have a smaller size in the width direction.

(1-7) If the fixed core 43 is formed by arranging two U-shaped cores in the width direction, it would be difficult for the first outer attraction surface 51a, the second outer attraction surface 52a, and the central attraction surface 53a to have an appropriate flatness. As such, after the two U-shaped cores are placed in the housing 13 through plastic molding, the attraction surfaces 51a, 52a and 53a would require grinding together with the end face 13a of the housing 13 to increase their flatness. This would complicate the manufacturing. In contrast, the present embodiment forms the fixed core 43 by layering the first U-shaped cores 61, the E-shaped cores 63, and the second U-shaped cores 62, allowing the first outer attraction surface 51a, the second outer attraction surface 52a, and the central attraction surface 53a to have a higher flatness. In addition, the attraction surfaces 51a, 52a and 53a of the fixed core 43, which is a laminate of the first U-shaped cores 61, the E-shaped cores 63, and the second U-shaped cores 62, can be ground before being placed in the housing 13 through plastic molding, thereby facilitating the manufacturing.

Second Embodiment

Figure 7:
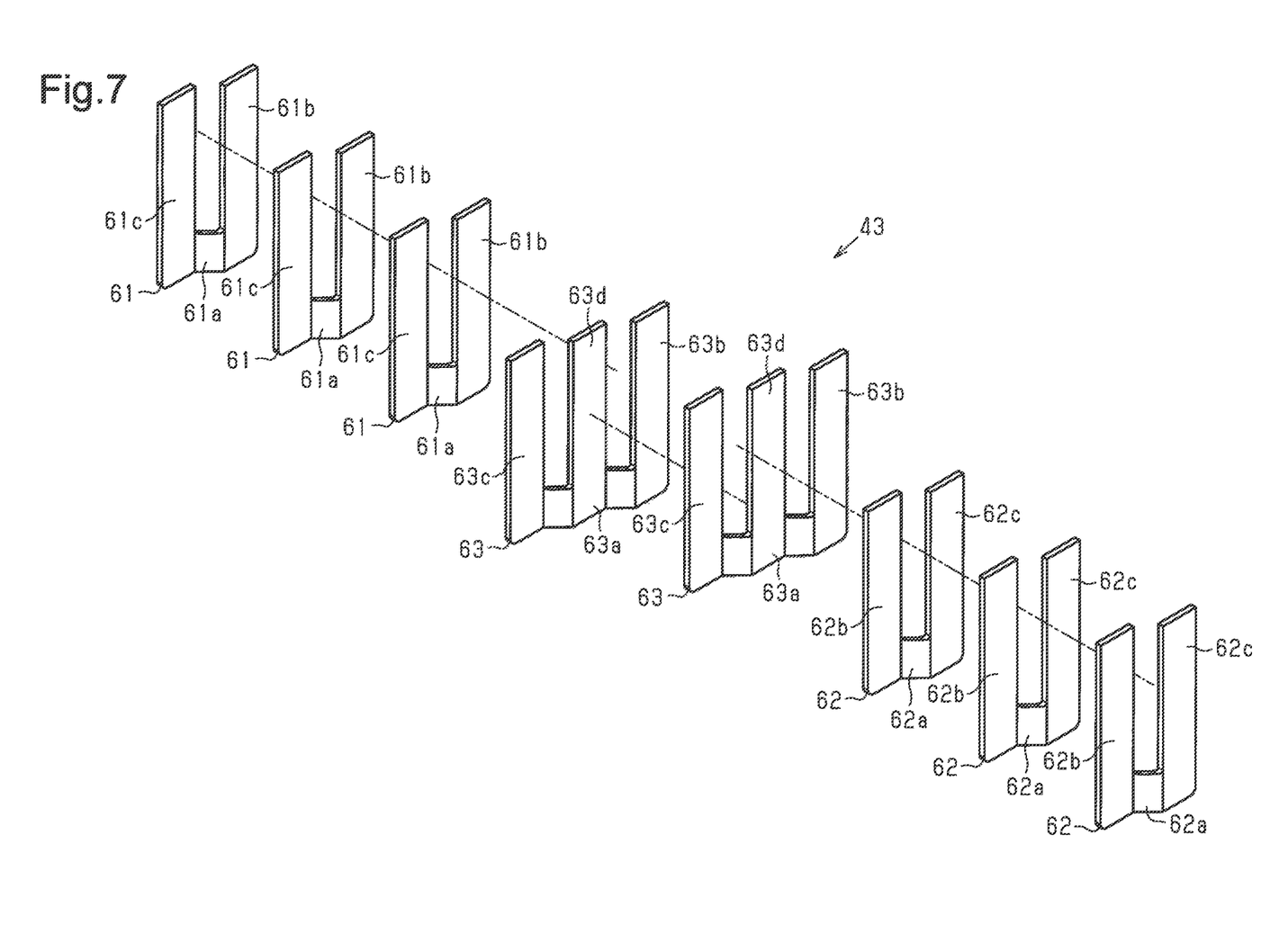
FIG. 7 is an exploded perspective view of a fixed core according to a second embodiment.
Figure 8:
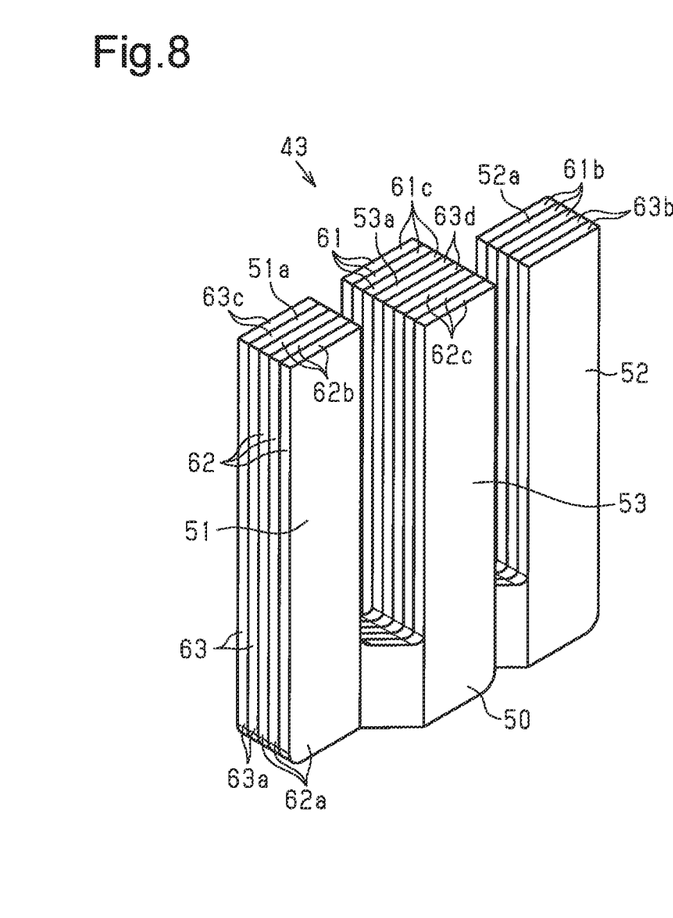
FIG. 8 is a perspective view of the fixed core of FIG. 7.
Figure 9:
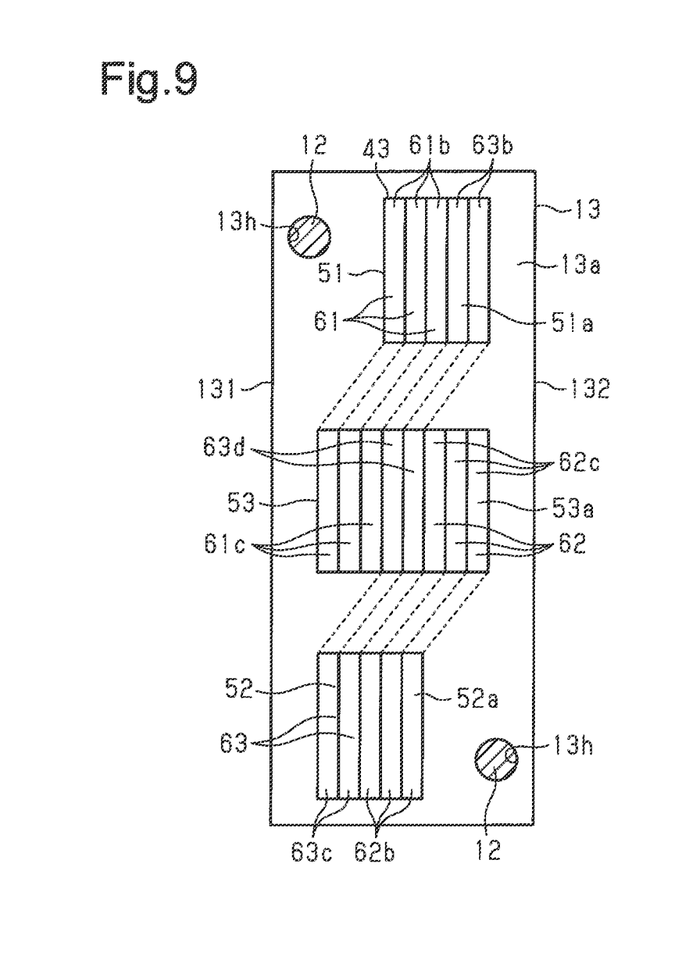
FIG. 9 is a cross-sectional view of an electromagnetic valve according to the second embodiment.

Referring to FIGS. 7 to 9, an electromagnetic valve according to a second embodiment is now described. In the description of the second embodiment, same reference numerals are given to those components that are the same as the corresponding components of the first embodiment. Such components will not be described in detail.

As shown in FIGS. 7 and 8, the base section 61a of each first U-shaped core 61 is bent such that the part connecting to the first leg section 61b is offset from the part connecting to the second leg section 61c toward the E-shaped cores 63. Thus, the first leg section 61b of the first U-shaped core 61 is offset from the second leg section 61c toward the E-shaped cores 63.

The base section 62a of each second U-shaped core 62 is bent such that the part connecting to the first leg section 62b is offset from the part connecting to the second leg section 62c toward the E-shaped cores 63. Thus, the first leg section 62b of the second U-shaped core 62 is offset from the second leg section 62c toward the E-shaped cores 63.

The base section 63a of each E-shaped core 63 is bent such that the part connecting to the first outer leg section 63b is offset from the part connecting to the central leg section 63d toward the second U-shaped cores 62 and that the part connecting to the second outer leg section 63c is offset from the part connecting to the central leg section 63d toward the first U-shaped cores 61. Thus, the first outer leg section 63b is offset from the central leg section 63d toward the second U-shaped cores 62, and the second outer leg section 63c is offset from the central leg section 63d toward the first U-shaped cores 61.

As shown in FIG. 9, in the lamination direction of the first U-shaped cores 61, the E-shaped cores 63, and the second U-shaped cores 62, the end face of the first outer leg 51 formed by a first outer leg section 63b is at the same position as the end face of the central leg 53 formed by a second leg section 62c. In this lamination direction, the end face of the second outer leg 52 formed by a second outer leg section 63c is at the same position as the end face of the central leg 53 formed by a second leg section 61c.

The first leg section 61b, which is the section of a first U-shaped core 61 forming the first outer leg 51 (a first section), is offset from the second leg section 61c, which is the section of the first U-shaped core 61 forming the central leg 53 (a third section), toward the second reference outer surface 132 of the housing 13. The first leg section 62b, which is the section of a second U-shaped core 62 forming the second outer leg 52 (a first section), is offset from the second leg section 62c, which is the section of the second U-shaped core 62 forming the central leg 53 (a third section), toward the first reference outer surface 131 of the housing 13.

The first threaded hole 13h is located between the first reference outer surface 131 and the sections of the first U-shaped cores 61 that are at least a part of the first outer leg 51 (the first sections). The second threaded hole 13h is located between the second reference outer surface 132 and the sections of the second U-shaped cores 62 that are at least a part of the second outer leg 52 (the first sections).

The second embodiment has the following advantages in addition to advantages (1-1), (1-2), (1-3), (1-5), (1-6) and (1-7) of the first embodiment.

(2-1) The section of each first U-shaped core 61 forming the first outer leg 51 (the first section) is offset from the section of the first U-shaped core 61 forming the central leg 53 (the third section) toward the second reference outer surface 132. The section of each second U-shaped core 62 forming the second outer leg 52 (the first section) is offset from the section of the second U-shaped core 62 forming the central leg 53 (the third section) toward the first reference outer surface 131. The first threaded hole 13h is located between the first reference outer surface 131 and the first sections of the first U-shaped cores 61, and the second threaded hole 13h is located between the second reference outer surface 132 and the first sections of the second U-shaped cores 62. Offsetting the first sections of the first U-shaped cores 61 from the third sections of the first U-shaped cores 61 toward the second reference outer surface 132 creates a space in the housing 13 for the first threaded hole 13h. Further, offsetting the first sections of the second U-shaped cores 62 from the third sections of the second U-shaped cores 62 toward the first reference outer surface 131 creates a space in the housing 13 for the second threaded hole 13h. This allows the housing 13 to have a smaller size, enabling the overall size of the electromagnetic valve 10 to be smaller.

The above-described embodiments may be modified as follows. The above-described embodiments and the following modifications can be combined as long as the combined modifications remain technically consistent with each other.

Figure 10:
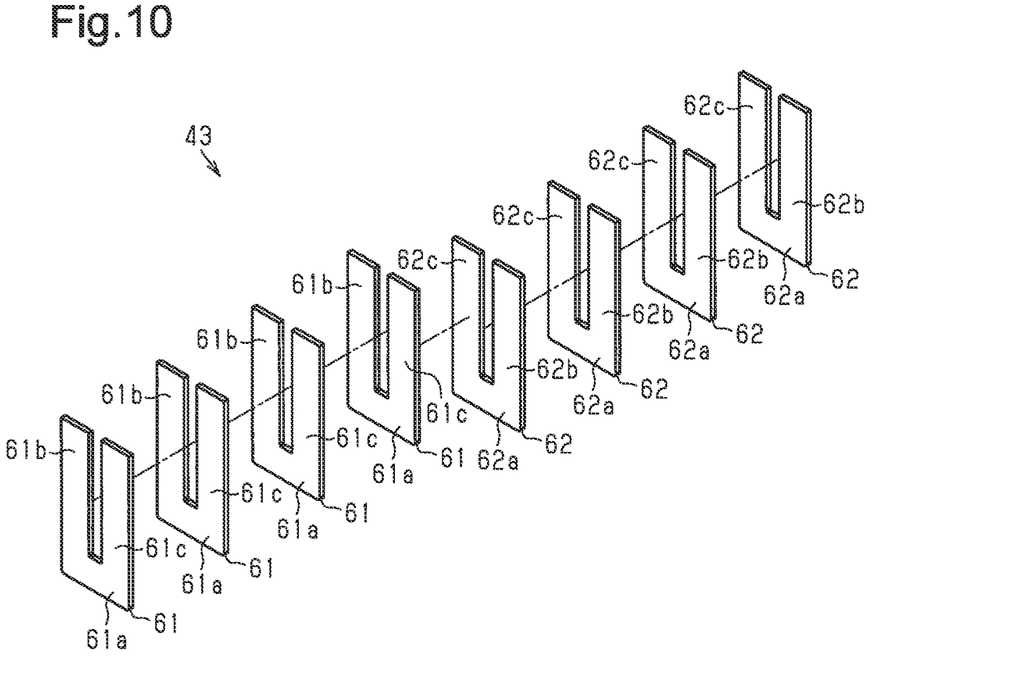
FIG. 10 is an exploded perspective view showing a fixed core of another embodiment.
Figure 11:
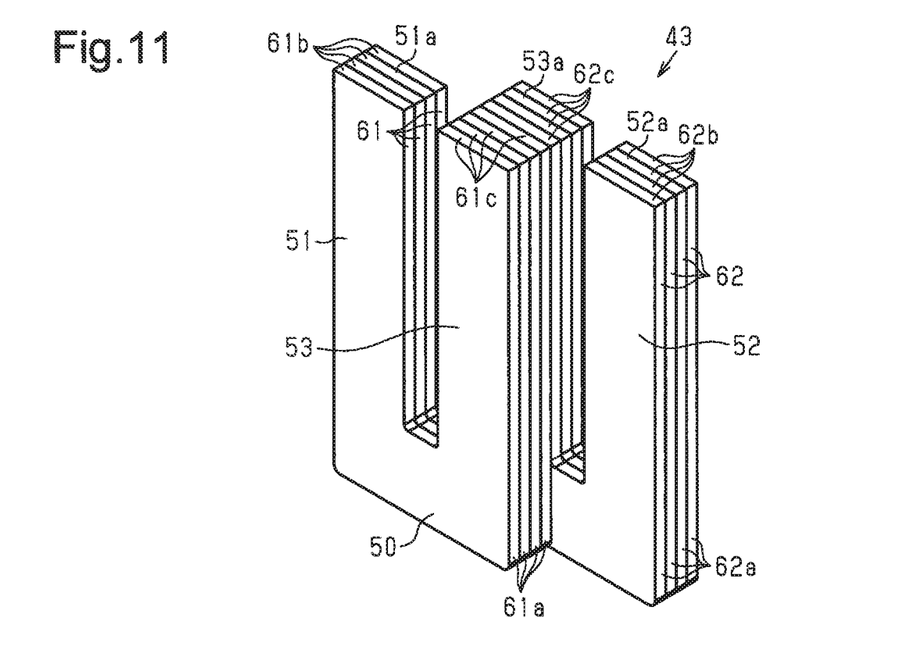
FIG. 11 is a perspective view of the fixed core of FIG. 10.

As shown in FIGS. 10 and 11, the fixed core 43 may be a laminate that includes one or more first U-shaped cores 61 and one or more second U-shaped cores 62 but not an E-shaped core 63. In this case, the first leg sections 61b of the first U-shaped cores 61 form the first outer leg 51 of the fixed core 43. The first leg sections 62b of the second U-shaped cores 62 form the second outer leg 52 of the fixed core 43. The second leg sections 61c of the first U-shaped cores 61 and the second leg sections 62c of the second U-shaped cores 62 form the central leg 53 of the fixed core 43. The fixed core 43 may be any laminate that includes at least first and second U-shaped cores 61 and 62.

In the second embodiment, the end face of the first outer leg 51 formed by a first outer leg section 63b and the end face of the central leg 53 formed by a second leg section 62c may be offset from each other in the lamination direction. In addition, the end face of the second outer leg 52 formed by a second outer leg section 63c and the end face of the central leg 53 formed by a second leg section 61c may be offset from each other in the lamination direction.

In the embodiments described above, the widths of the first and second leg sections 61b, 61c, 62b and 62c, the first and second outer leg sections 63b and 63c, and the central leg sections 63d may be modified as appropriate. Nevertheless, the central attraction surface 53a needs to be larger in area than each of the first and second outer attraction surfaces 51a and 52a.

In the embodiments described above, the numbers of the first U-shaped cores 61, the second U-shaped cores 62, and the E-shaped cores 63 may be modified as appropriate.

In the embodiments described above, the coil 41 may be wound only around the periphery of the central leg 53.

In the embodiments described above, the fixed core 43 does not have to be a laminate of the first U-shaped cores 61, the second U-shaped cores 62, and the E-shaped cores 63, and the fixed core 43 may be formed by an E-shaped core member.

In the embodiments described above, the fixed core 43, in which the central attraction surface 53a is larger in area than each of the first and second outer attraction surfaces 51a and 52a, may be formed, for example, by arranging two U-shaped cores side by side in the width direction, with the adjacent leg sections serving as the central leg.

In the embodiments described above, the electromagnetic valve 10 may be a three-port switching valve including a body 11 having one supply port, one output port, and one discharge port, for example.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electromagnetic valve comprising a solenoid, wherein:
the solenoid includes:
a coil,
a plunger configured to be moved by magnetic excitation of the coil,
a fixed core configured to attract the plunger, and
a plunger spring configured to urge the plunger in a direction away from the fixed core;
the fixed core is E-shaped and includes:
a base,
a first outer leg and a second outer leg extending parallel to each other from the base, and
a central leg extending from the base and located between the first and second outer legs;
the first outer leg has a distal end, which is opposite to the base and includes a first outer attraction surface configured to attract the plunger;
the second outer leg has a distal end, which is opposite to the base and includes a second outer attraction surface configured to attract the plunger;
the central leg has a distal end, which is opposite to the base and includes a central attraction surface configured to attract the plunger; and
the central attraction surface is larger in area than each of the first and second outer attraction surfaces;
the fixed core includes:
a first U-shaped core including a first section, which is at least a part of the first outer leg, a second section, which is a part of the base, and a third section, which is a part of the central leg and matches the central leg central attraction surface area, and a second U-shaped core including a first section, which is at least a part of the second outer leg, a second section, which is a part of the base, and a third section, which is a part of the central leg and matches the central leg central attraction surface area; and the fixed core is a laminate in which at least the first and second U-shaped cores are stacked.

2. The electromagnetic valve according to claim 1, wherein the fixed core further includes an E-shaped core, which is a part of each of the base, the first outer leg, the second outer leg, and the central leg, and the fixed core is a laminate in which the first U-shaped core, the E-shaped core, and the second U-shaped core are stacked in this order.

3. The electromagnetic valve according to claim 1, further comprising:

a body defining a plunger chamber that accommodates the plunger; and a housing that is made of plastic, has a shape of a rectangular block, and is coupled to the body by two bolts, wherein:

the fixed core and the coil are placed in the housing through plastic molding;

the housing includes:
a first reference outer surface, which is closer to the first U-shaped core in a lamination direction in which the first and second U-shaped cores are stacked, and
a second reference outer surface, which is closer to the second U-shaped core in the lamination direction;

the first and second reference outer surfaces are parallel to each other;

the fixed core is placed in the housing such that the fixed core is inclined relative to the first and second reference outer surfaces;

the housing has first and second threaded holes each configured to receive a corresponding one of the two bolts;

the first threaded hole is located between the first reference outer surface and the first section of the first U-shaped core; and the second threaded hole is located between the second reference outer surface and the first section of the second U-shaped core.

4. The electromagnetic valve according to claim 1, further comprising:

a body defining a plunger chamber that accommodates the plunger; and a housing that is made of plastic, has a shape of a rectangular block, and is coupled to the body by two bolts; wherein:

the fixed core and the coil are placed in the housing through plastic molding;

the housing includes:
a first reference outer surface, which is closer to the first U-shaped core in a lamination direction in which the first and second U-shaped cores are stacked, and
a second reference outer surface, which is closer to the second U-shaped core in the lamination direction;

the first and second reference outer surfaces are parallel to each other;

the first section of the first U-shaped core is offset from the third section of the first U-shaped core toward the second reference outer surface;

the first section of the second U-shaped core is offset from the third section of the second U-shaped core toward the first reference outer surface;

the housing has first and second threaded holes configured to receive the bolts;

the first threaded hole is located between the first reference outer surface and the first section of the first U-shaped core; and the second threaded hole is located between the second reference outer surface and the first section of the second U-shaped core.

5. The electromagnetic valve according to claim 1, wherein the coil is one of a plurality of coils each wound around a periphery of a corresponding one of the first and second outer legs.

* * * * *